INVENTORS.
LEROY E. SOLOMON
JOHN R. SMYTH
BY Edward J. Dwyer
ATTORNEY

United States Patent Office 2,727,081
Patented Dec. 13, 1955

2,727,081

PREPARATION OF PASTE FOR STORAGE BATTERY PLATES

Leroy E. Solomon, Philadelphia, Pa., and John R. Smyth, Westport, Conn., assignors to The Electric Storage Battery Company, a corporation of New Jersey Application September 8, 1952, Serial No. 308,456

6 Claims. (Cl. 136—27)

The present invention relates to improved methods of preparing pastes for storage battery plates and has for an object the provision of a process for mixing the paste for lead-acid battery plates to produce pasted plates which are harder and less susceptible to damage by handling either in the unformed or formed condition and which have a prolonged life in service.

In the preparation of pastes to be applied to grids in the manufacture of lead-acid storage batteries, it has long been the practice of the art to add the activating reagent, such as sulphuric acid, to a mixture of lead oxides and water over a prolonged period of time, upwardly of ten minutes, to limit the temperature rise of the mixture. Such temperature rise has long been thought directly to improve the quality of the paste and particularly its ability to act as a cementing agent in binding the resulting mixture of lead sulphate together. It has also been believed that by limiting the maximum temperature, the time required to cool the paste to a "handling" temperature is decreased.

In carrying out the present invention new and unexpected results have been achieved by preparing the paste by a method which comprises an acid-addition step which is required to be completed during a time interval of not less than one-half minute and not exceeding about four minutes, but preferably between one and one-half and two minutes. As a result of the utilization of an acid-addition time within the aforesaid range there is imparted to the paste a quality which is different in kind from that achieved by the long acid-addition times of conventional practice. The paste is harder, and is less susceptible to both cracking and flaking. As a result of this acid-addition time there is also achieved a longer life of the plates in battery service.

Further objects and advantages of the present invention will be set forth in the following detailed description, taken in conjunction with the accompanying drawings, in which.

Figure 2:
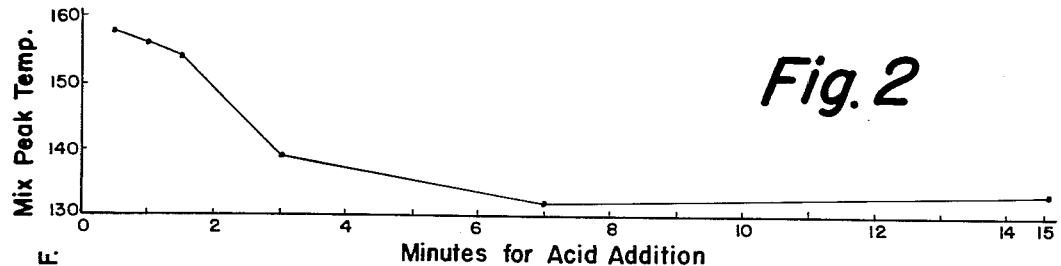
Fig. 2 is a graph of maximum temperature of mixtures of lead compounds and acid versus addition times for the acid.
Figure 2A:
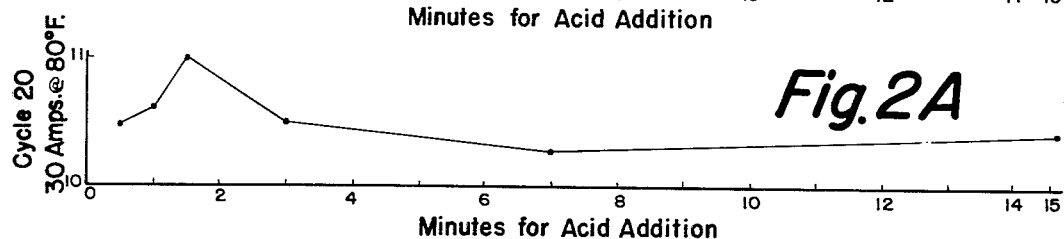
Figure 3:
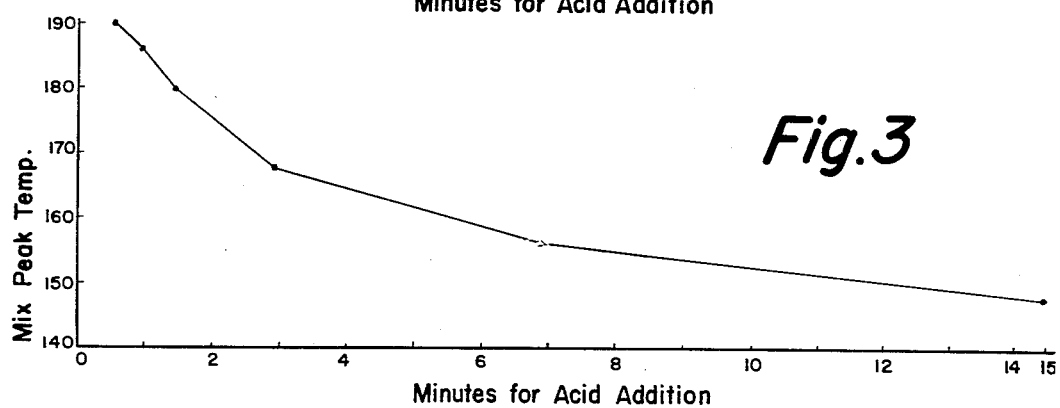
Figure 3A:
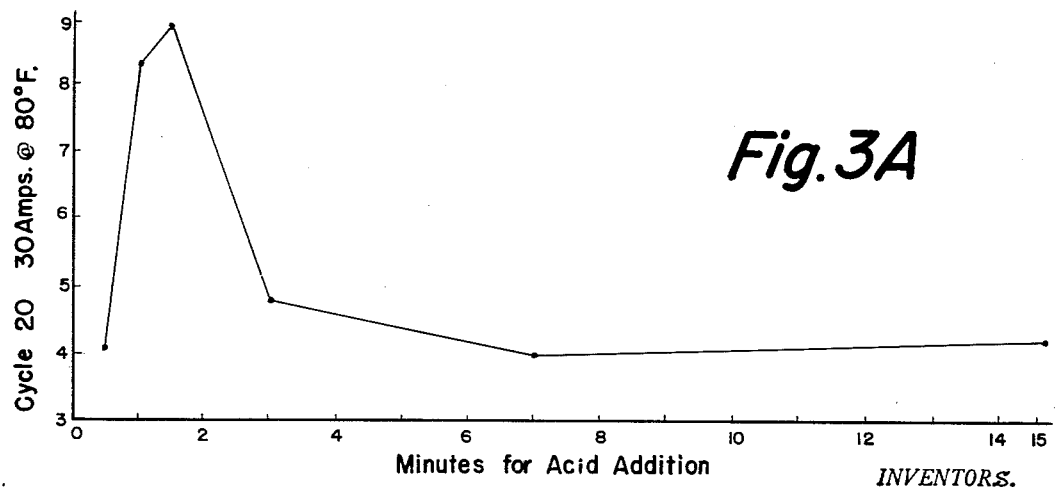
Figure 4:
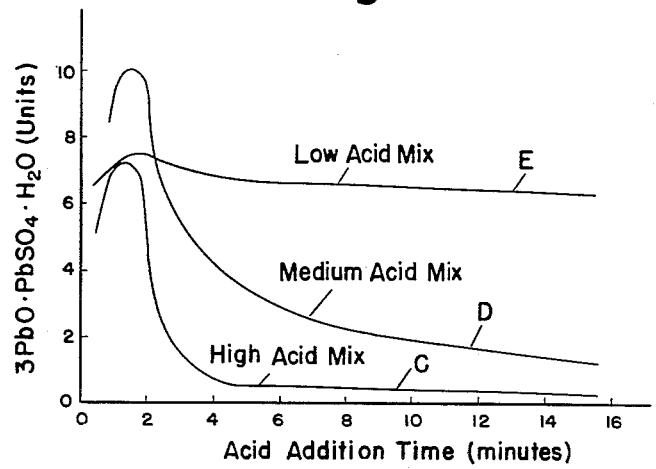
Figure 5:
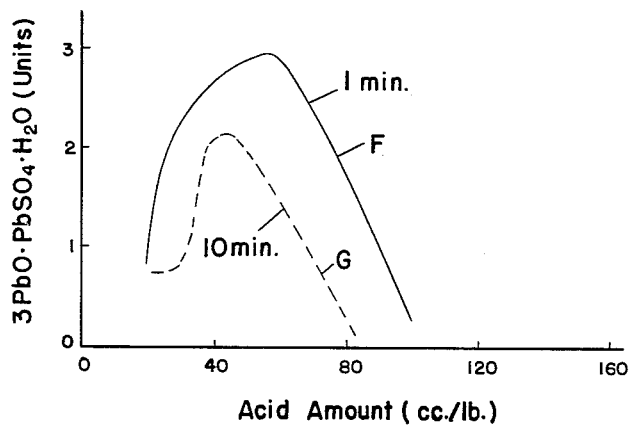

Fig. 2-A is a graph of capacity after 20 life cycles of the plates formed from the pastes represented in Fig. 2 versus acid-addition time;

Fig. 3 is a graph similar to Fig. 2 except that the sulphuric-acid concentration per pound of lead oxides was increased over that of Fig. 2;

Fig. 3-A is a graph similar to Fig. 2-A for plates formed from pastes represented in Fig. 3;

Fig. 4 is a graph showing the rleative amounts of tribasic lead sulphate hydrate produced with varying addition amounts of sulphuric acid plotted against varying acid-addition times; and Fig. 5 is a graph of the relative amounts of tribasic lead sulphate hydrate formed with varying amounts of acid and comparing addition times of one minute and ten minutes for the total acid.

As will be later explained in detail, the present invention is applicable to a wide variety of pastes suitable for application to storage battery grids, both as to changes in the ingredients thereof and in the treatments required for the ultimate use of the battery. In each case, by utilizing an acid-addition time of predetermined short length, real and significant improvements have been achieved. These will be set forth in the order in which they arise from the beginning of the preparation of the paste to the final battery, and not necessarily in order of their importance.

For positive or negative plates the paste mixture may comprise lead (Pb), lead oxide (PbO), red lead ($Pb_3O_4$), and other oxides, carbonates, etc., mixed with water. In the mixing operation to which the invention is directed, the acid is then added during the time interval of not less than one-half a minute and not more than about four minutes.

Figure 1:
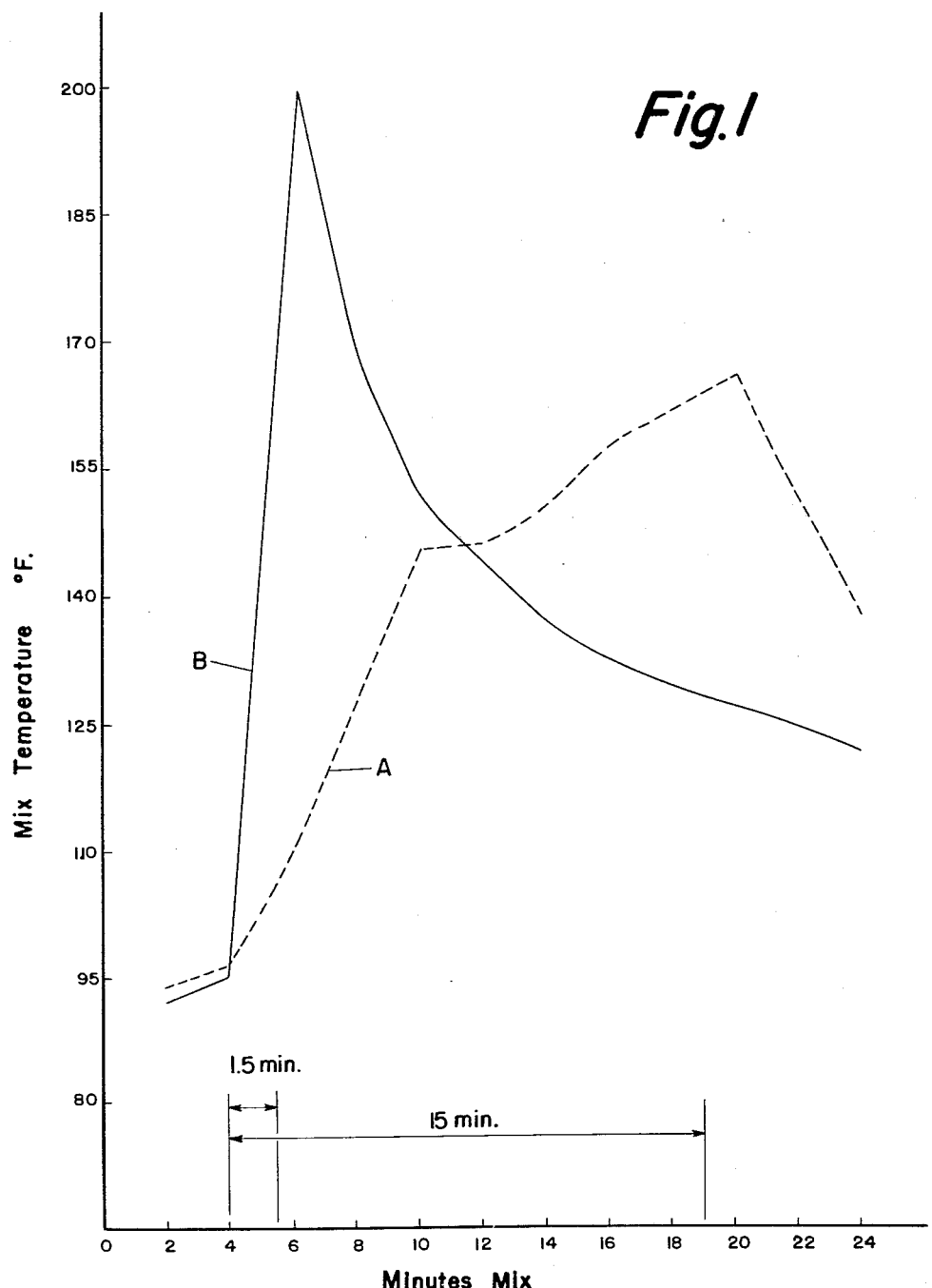
Fig. 1 is a graph of mixing temperature versus time for comparison of the temperature of paste with total addition time for acid of fifteen minutes and one and one-half minutes respectively.

In the practice of the present invention, including the rapid acid-addition step during mixing of the paste, there occurs a striking difference in the time-temperature relationship over that heretofore used. In Fig. 1 the curve A plotted in minutes as abscissae against temperature as ordinates, is typical of the time-temperature relationship of a conventional mixture of ingredients where the mixing time is long, of the order of fifteen minutes. The curve B of Fig. 1, for the same conventional mixture of ingredients processed in accordance with the invention, clearly shows the attainment of maximum temperature at approximately two minutes after the start of the acid-addition step, with acid addition being completed in one and one-half minutes. The time of water mix, shown as four minutes, can be varied through any limits without affecting the acid-addition step.

Curves A and B illustrate a slight rise in temperature during an initial water mix of about four minutes. Acid addition begins for both curves at the end of the initial four-minute period. Thus, for curve A, representing previous practice, and with the beginning of the addition of acid occurring after the initial four-minute period, the temperature rise is progressive and fairly uniform for the next five or six minutes, followed by a slower rise in temperature and the attainment of the maximum temperature after about sixteen minutes. The rate of addition of acid was uniform from about four minutes to about nineteen minutes for a total addition time of fifteen minutes.

In contrast with curve A, when all of the acid is added in one and one-half minutes as illustrated by curve B, the temperature rises rapidly and uniformly to a maximum of about 200° F. in about two minutes, after which the temperature rapidly decreases to about 120° in slightly over twenty-four minutes. When the paste has air-cooled to about 120° F., it can be "dumped" or discharged from the mixer into suitable containers and transported to the pasting machine. Thus, it will be seen that notwithstanding the fact the maximum temperature is much higher for curve B than for curve A, nevertheless the time elapsed before dumping is actually less than with the prior art practice as represented by curve A. While this is an unexpected advantage of the present invention, the real importance and contribution resulting from the fast acid-addition step appears to be caused by the high temperature which is attained in the short interval of time followed by the rapid decrease in temperature, thus establishing a preferred sulphate composition and terminating the reaction by the rapid cooling. Although the exact nature of the chemical reactions involved is not known with absolute finality, nevertheless the end results in terms of improved paste, improved life, and the like, have been confirmed for wide ranges of ingredients in both positive and negative mixes.

As shown by curve A, acid addition occurs over a fifteen-minute interval and with air cooling it will be seen that the temperature decreases fairly rapidly only after acid addition has been completed. Even if artificial cooling were resorted to in the process illustrated by curve A, it would not decrease the required fifteen-minute mixing time. However, with practice of the method of the present invention, which gives rise to curve B of Fig. 1 and with the mixing time of one and one-half minutes, it will be understood that the overall time involved could be greatly decreased by utilizing artificial heat-exchange to accelerate cooling of the mixture rather than by depending on air cooling alone.

The paste mix is machine or hand pasted into grid forms and is then dried in one of several ways well known in the art. That is, plates may be hung and air dried or held in a chamber of high humidity to condition them before drying. Plates may also be surface dried by flames or otherwise, then piled and allowed to dry over a period of several days. Such drying methods are varied in accordance with the general processing methods or the mixture of oxides or leads used. However, no matter what the drying process may be, the short acid-addition time gives a plate of harder structure and one that is more crack-free. Plates made in accordance with the present invention are also less dusty and, therefore, handle better, thereby resulting in less plate scrap than plates produced with conventional long acid-addition times.

In terms of life of the battery, particularly as reflected in cycle life, a material increase occurs with acid-mixing times in the range of from one to four minutes, plus or minus one-half a minute, with the maximum increase resulting from an acid-addition time of one and one-half to two minutes. When the mixing time is much less than one-half a minute or exceeds about four minutes there is a decrease in battery life.

The correlation between increased battery life and short mixing times is rather striking as may be seen by referring to Figs. 2, 2-A, 3 and 3-A. In Figs. 2–3–A there are illustrated the results of a series of tests with mixing times, shown as abscissae, varying from about one-half a minute to fifteen minutes. In Fig. 2 the maximum temperature attained during the acid-addition step has been plotted as ordinates, and it will be seen that the temperature is maximum with the minimum mixing time of about one-half a minute with a rapid decrease from about one and one-half minutes until a mixing time of about three minutes was utilized. Thereafter the rate of change of the maximum temperature was less as the mixing time increased. As illustrated in Fig. 2–A, a pronounced maximum capacity occurred with a mixing time of approximately one and one-half minutes. The half-minute mixing time showed a greatly decreased capacity, while a mixing time of about three minutes showed a similar decrease. The mixing time had almost negligible effect when increased materially above four and one-half minutes.

Figs. 2, 2–A, 3 and 3–A were based upon tests of identical mixes except that the paste and plates formed therefrom providing the data for the curves of Figs. 3 and 3–A contained a higher concentration of acid per pound of lead compounds.

As shown in Fig. 3, the maximum temperature occurred within about one-half a minute. It rapidly decreased as the mixing time increased to about two and one-half minutes with further decrease as the mixing time was extended. However, the capacity (Fig. 3–A) rose rapidly to a maximum with a mixing time of about one and one-half minutes and then rapidly decreased. There was inconsequential change in cycle life for mixing times materially above about four and one-half minutes.

The cycle tests forming the basis of Figs. 2–A and 3–A were carried out as follows: After charging, the plates were discharged at thirty amperes per plate until a final voltage of 1.5 was reached and at a temperature of 80° F. They were then charged at 16⅔ amperes for a three-hour period, or a total charge equal to 120% of discharge. The curves of Figs. 2–A and 3–A represent the twentieth discharge and thus indicate that plates having mixing times within the range of from about one minute to about two minutes were capable of maintaining the discharge rate for many minutes more than plates made with acid-addition times materially less or materially greater than said range.

After completion of pasting and drying of the plates they are then "formed" in any manner well known in the art. After formation the plate is ready for use. We have found that the fast acid-addition step results in a retention of the active material on the plate to a greater degree than the same material where the paste has been prepared with conventional slow acid-addition; and to a greater degree than can be attained with acid-addition during a time less than the minimum established in accordance with the present invention. Thus, shedding of the active material of the positive plate is greatly retarded by using an acid-addition time of from one and one-half to four minutes.

Our experimental work establishes the many new results achieved by the change in acid-addition times. During the studies made which resulted in the present invention, considerable attention has been given to the reasons why the critical acid-addition time produces such superior results. Though we have not reached final conclusions upon all aspects—the subject being a complicated one—nevertheless, we have tentatively formulated theories which we believe may suggest what occurs and the reasons therefor.

When sulphuric acid is added to mixtures of lead oxides, exothermic chemical reactions occur with development of heat and rise of temperature which, as already explained, will be at a rate dependent upon the rapidity with which the acid is added. We believe that the rapid addition gives rise to preferred complex lead sulphates which have cementitious properties superior to the sulphates formed with long acid-addition times. We believe that the complex compounds formed during the controlled acid-addition step produce the superior cementing action which exhibits itself in both formed and unformed plates.

Advantage has been taken of the results of X-ray diffraction analyses of the plates before formation to formulate our theories as to why the new results have been obtained. Referring to Fig. 4, the data from such X-ray analyses have been summarized in the form of graphs with acid-addition time in minutes as abscissae and the quantity of tribasic lead sulphate hydrate (or tribase)

$$(3PbO.PbSO_4:H_2O)$$

as ordinates. The units on the ordinates scale are arbitrary but directly related to quantity. Acid was added in an amount within the range of from about 20 cc. per pound to about 100 cc. per pound lead oxides. The formation of the tribasic lead sulphate hydrate is least for the graph C with relatively large amounts of sulphuric acid per pound of oxides during an addition time for acid exceeding about four and one-half minutes. However, when the acid-addition time was approximately one minute, there was rapid rise in the amount of the tribasic lead sulphate hydrate, reaching a maximum at about 7 on the scale and thereafter rapidly decreasing. The remaining graphs D and E of Fig. 4 and the graphs of Fig. 5 are for the same lead oxide mixtures. However, for the graph D of Fig. 4, relatively smaller amounts of sulphuric acid per pound of oxide mixture were added. A maximum formation of the tribasic lead sulphate hydrate occurred with about two minutes for the acid-addition—the amount of tribase rapidly decreasing on either side of the maximum. With the acid per pound of oxide mixture still further decreased, the difference in the amount of tribasic lead sulphate hydrate formed with varying acid-addition time is less, but there still appears a pronounced maximum with mixing times from about one minute to about three minutes. Thus, it will be seen that there appears to be good correlation between the relative amount of tribasic lead sulphate hydrate and increased capacity, increased cycle life, and improvement in the unformed plates in respect to handling ability. Maximum tribase, life, capacity, and plate hardness occur at the same place on the acid-addition graph, regardless of the amount of acid, at one and one-half minutes plus or minus one-half minute.

As a result of the maxima occurring in curves C, D and E with mixing times in the region of from one to three minutes as shown in Fig. 4, further studies resulted in the graphs F and G of Fig. 5. In Fig. 5 the acid-addition time was held constant for graph F at one minute and it was held constant at ten minutes for graph G. There was then plotted the relative quantity of tribasic lead sulphate hydrate produced with variation of the acid in ccs. per pound over a relatively wide range from about twenty ccs. to about one hundred ccs. It will be seen that with the short—approximately one minute—mixing time, more of the tribasic lead sulphate was formed for all acid concentrations than with the ten-minute mixing time. As shown by graph G, for the shorter mixing time the maximum occurred at about fifty-five ccs. per pound.

In summary, we have found that all pastes of usable consistency are benefited by the use of the fast acid-addition step of the present invention. With the preferred range of from one and one-half to two minutes, plus or minus one-half minute, there are substantial and significant improvements as regards increase in the hardness of the unformed plates, greater strength of the paste and increased adherence of the paste to the plates.

As the amount of acid per pound is increased, each plate has a greater ampere-hour capacity; with lesser amounts of acid the life increases. However, by utilizing a mixing time within the critical range characterizing the present invention, the plate life is extended; thus for a desired high capacity battery without reduction of life, a lesser amount of the lead oxides may be used. Stated in another way, with the same ampere-hour capacity desired and with the same amount of lead oxides, a longer life can be achieved.

By reason of the mixing time within the critical range, significant formations of complex lead compounds occur, and the formations thereof may be due to the time-temperature relationship. That is to say, a rapid rise and fall in temperature without maintaining relatively high temperatures over a prolonged period will achieve an actual saving in dumping time over the prior commercial practice, including long acid-addition times.

What is claimed is:

1. The method of increasing the basic lead sulphate hydrate content in an unformed lead battery plate which consists in adding sulphuric acid to a mixture of lead and lead oxides within the range of from about one minute to about three minutes to form a paste, cooling said mixture to less than 125° F. in less than twenty minutes after the addition of acid to said mixture, and applying said paste to a grid to form said plate.

2. The method of increasing tribasic lead sulphate hydrate content in an unformed lead battery plate which consists in adding sulphuric acid to a mixture of lead and lead oxides within the range of from about one minute to about three minutes to form a paste, cooling said mixture to less than 125° F. in less than twenty minutes after the addition of acid to said mixture, and applying said paste to a grid to form said plate.

3. In the process of preparing paste for lead storage battery plates in which sulphuric acid is mixed with oxides of lead and water, the improvement consisting in adding all of said acid to said lead oxides in not less than one-half minute and not exceeding four minutes.

4. In the process of preparing paste for lead battery plates which comprises mixing sulphuric acid with a mixture of a lead containing material selected from the group consisting of lead, lead oxides and lead carbonates and water, the improvement which consists in adding all of said acid within a time interval of from one to three minutes at a concentration of from about 20 cc. of acid per pound of lead compounds to about 100 cc. of acid per pound of lead compounds.

5. In the process of preparing paste for lead battery plates which comprises mixing sulphuric acid with a mixture of lead containing material selected from the group consisting of lead, lead oxides and lead carbonates and water, the improvement which consists in adding all of said acid within a time interval of from one to three minutes in an amount of from about 35 cc. of acid per pound of lead compounds to about 85 cc. of acid per pound of lead compounds.

6. In the process for preparing paste for lead storage battery plates in which sulphuric acid is mixed with a lead containing material selected from the group consisting of lead, lead oxides and lead carbonates and water, the improvement consisting in adding all of said acid to said lead containing material in not less than one half minute and not exceeding four minutes.

References Cited in the file of this patent

UNITED STATES PATENTS

| | | |
|---|---|---|
| 2,422,437 | Plews | June 17, 1947 |
| 2,575,088 | Barak | Nov. 13, 1951 |